June 23, 1936.   E. W. VESSEY   2,045,149

APPARATUS FOR HARVESTING AND PACKAGING LETTUCE AND THE LIKE

Filed May 15, 1935

INVENTOR.
ELTON W. VESSEY
BY
ATTORNEY

Patented June 23, 1936

2,045,149

UNITED STATES PATENT OFFICE 2,045,149

APPARATUS FOR HARVESTING AND PACKAGING LETTUCE AND THE LIKE

Elton W. Vessey, Pasadena, Calif.

Application May 15, 1935, Serial No. 21,562

2 Claims. (Cl. 214—82)

This invention relates particularly to an apparatus for and method of harvesting and packaging lettuce and other vegetables.

An object of the invention is to provide an apparatus for and method of harvesting vegetables, and particularly lettuce which is usually grown in long rows or beds, and over which a vehicle is drawn, and into which the cut vegetables are placed, the said vehicle having wheels thereon, the gage of which will span one or more rows of vegetables, the said vehicle, when full, being brought to a packing house whereat the said vehicle is moved slowly past workers who remove the vegetables from the trailer and trim and pack the same, the said vehicle having a body thereon by means of which the vegetables carried by the said vehicle are continuously fed toward that side of the vehicle along which the workers are arranged, so that the vehicle is completely emptied of its contents by the time it reaches the last of the said workers in the said packing house.

A further object of the invention is to provide a vehicle for transporting bulk vegetables such as lettuce from the fields in which the said vegetables are grown to the packing house, the said vehicle having a relatively low chassis, whereby the said vegetables may be easily placed on the said vehicle, and the gage of the vehicle wheels is relatively narrow so as to pass over one or more rows of vegetables, and the said vehicle is provided with a movable bed on the chassis, and one side of said bed is adapted to be moved on the chassis when in the packing house, whereby as the vehicle is moved progressively through the packing house, the vegetables on said bed are automatically fed or dumped toward one side of the vehicle.

Other objects of the invention are to provide a method of and apparatus for handling vegetables from the time that the same are cut in the fields to the point where the same are packaged in the packing house; which involves the employment of a lesser number of field hands than is now required by any of the present systems; which permits the field hands used in connection with my method to start and maintain continuous working operations throughout the entire period of the working day, which involves the use of equipment; the capital cost of which over a selected period of time, is less than the cost of equipment now necessary for use in connection with the present methods of harvesting lettuce; and which permits of a packing shed of smaller size than is now required, as well as a fewer number of workers than now required in order to handle approximately the same or a larger output of lettuce. I have found that the labor costs usable in connection with my method and apparatus is approximately one-half of that incurred in connection with present methods for delivering the same final volume of packed material.

Other objects of the invention are to provide a method of and apparatus for handling lettuce that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Referring to the drawing:

Fig. 2 is an enlarged cross section through the packing shed showing one of the vegetable carrying vehicles disposed therein in relation to the bunches of the trimmers and packers.

Fig. 3 is an end view of one of the vehicles showing the bottom of the said vehicle in a tilted position.

Fig. 4 is a side view of one of the vehicles.

Fig. 5 is a perspective view of the tiltable bed or pan of the vehicles.

Fig. 6 is a perspective view of a modified form of vehicle.

Fig. 7 is a section taken through Fig. 6 on the line 7—7.

Figure 1:
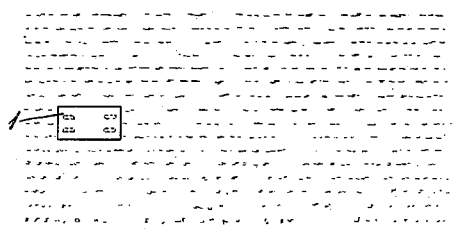
Fig. 1 represents a plan view of a lettuce field indicating the rows of growing lettuce and a packing shed located in operative relation thereto.
Figure 1:
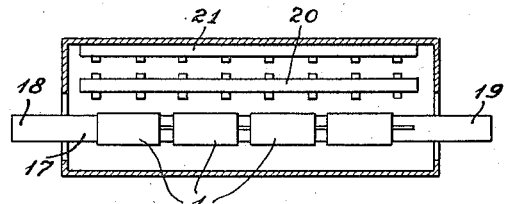
Figure 1:
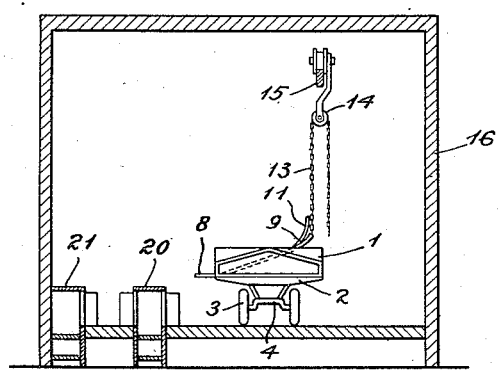
Figure 1:
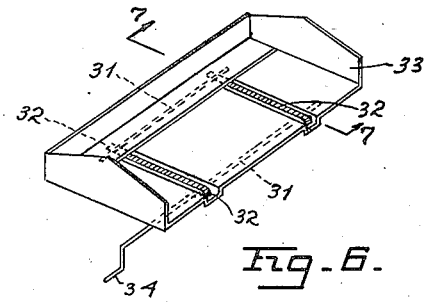
Figure 1:
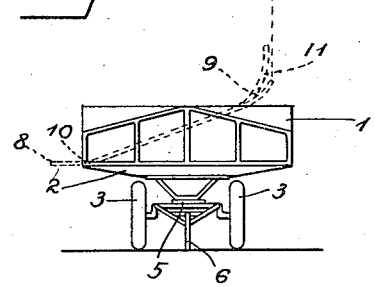
Figure 1:
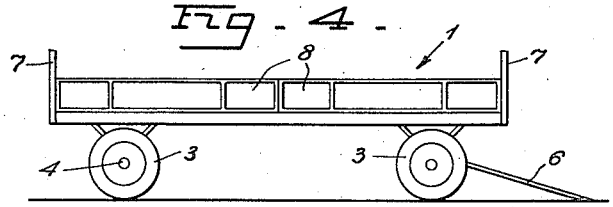
Figure 1:
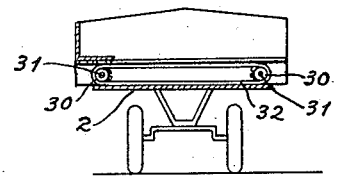
Figure 1:
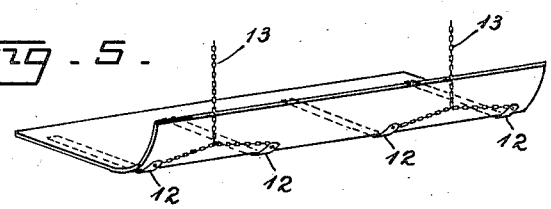

The present methods of harvesting lettuce and thereafter preparing it for shipment, are not at all economical, and by reason of the continuing investment required, constantly burdens the grower with an overhead which materially reduces the profits to be earned. The most generally used method of handling lettuce for market purposes involves substantially the following elements. Wooden field crates are first deposited throughout the field in which the lettuce is to be cut. The field hands start down the rows of lettuce, cutting the same, and one of their number packs the same in the field crates. A truck or wagon next transports the packed field crates from the fields to the packing shed where the said crates are stacked or stored until the trimmers and packers in said packing shed are able to dispose of the material packed in said crates. In the packing shed usually two workers, known as trimmers, remove the heads of lettuce from the crate, discarding the heads that are not solid or are spoiled, and cutting from all of the usable heads a certain portion of the outer leaves. The trimmed heads are then placed in crates by packers who pack so many heads per case, after which the same are iced and nailed up, and then shipped to market.

In the system just outlined, the investment necessary for field crates runs into considerable money in that said crates are fragile and are constantly breaking down, due to the rough handling to which they are subjected. The amount of field labor necessary for packing the crates is likewise excessive in that the workers cut only as much lettuce as it suits their fancy to handle. Likewise, the workers cut the lettuce indiscriminately from the various rows of lettuce over which they move, necessitating a subsequent going over and a recutting from the same identical rows. Once the lettuce has been packed in the field crates, it is necessary to lift the same into a truck or wagon, and as soon as the crates reach the packing shed, additional labor is required to move the same from the truck or wagon. Thereafter an additional labor cost is necessary in order to move the field crates from the point of initial storage in the packing house to the benches of the workers where the said lettuce may be removed preparatory to trimming and packing. In the event the operator is unable to keep the field crates flowing evenly and uniformly to the packing house, and the empty crates flowing evenly and uniformly back to the fields, it results that either the field workers will be held up for crates, or the packing house workers will be held up for material to work with.

In my invention I utilize a mobile vehicle 1, having a low bed chassis 2, carried upon narrow or wide gage wheels 3. The gage of the wheels is such that one or a plurality of lettuce rows will be spanned. The rear wheels 3 of the vehicle 1 are mounted to rotate on a fixed axle 4, while the front wheels 3 of the said vehicle are mounted on an axle which is related to a fifth wheel 5, which is interposed between the said axle and the bottom of the chassis 2. A tow bar 6 is mounted on the front axle for the purpose of drawing the said vehicle, and for steering it in any desired direction. The width of the chassis 2 is approximately equal to the distance between three rows of lettuce, whereby when the said vehicle is being drawn over a row or rows of lettuce in the fields, the said vehicle is accessible to five rows of lettuce.

With my system, one of the vehicles would be brought into the field when lettuce is to be harvested, and slowly moved down over the rows of lettuce at a rate of speed which would permit the said vehicle to be filled with heads of lettuce as it moves. With my system, the heads of lettuce are bulked discriminately into the vehicle, and whenever the vehicle is fully loaded, it is towed to the packing house where it is placed at the rear of one or more loaded carriers of lettuce which have previously been brought to the said packing shed. Whenever a vehicle filled with the cut heads of lettuce is removed from the fields, it is replaced by any empty vehicle, whereby the cutting operations of the field workers may not be interrupted. The workers may thus, during the working period continuously fill the vehicles with lettuce without interruption, and the time necessary for drawing the field vehicle to the packing shed and returning an empty vehicle would approximately equal the length of time necessary for the field crew to completely fill one of the said vehicles with cut heads of lettuce.

Each vehicle is provided with permanent end boards 7 and with hinged side boards 8 along both sides thereof. The tray or bed 9 which covers substantially the entire upper side of the floor 10 of the chassis 2, is hinged at 10 along one side of the chassis adjacent the side board 8. The bed 9 is preferably made of light gage sheet metal and the free side thereof is curved upwardly as at 11. When the bed 9 is rested upon the floor of the chassis 2, the curved side 11 thereof is adapted to be sealed by said board 8 along that side of the vehicle. A series of bars 12 are riveted or otherwise fixedly secured to the underside of the bed 9, and said bars 12 have ends thereof projecting beyond the curved side 11 of said bed. The bars 12 are arranged in pairs so that there is a pair of said bars adjacent each of the opposite ends of the said tray. The bars 12 are adapted to be engaged by the chains 13 connected to an overhead hoist 14 movably mounted on an overhead trackway 15, which is arranged within the packing shed 16.

The packing shed 16 is provided with a trackway 17 therethrough, on which the mobile vehicles are adapted to be positioned when passing through the said packing house, said trackway 17 communicating at 18 with an entrant ramp and at 19 with an exit ramp. Between one side of the vehicle and the side wall of the packing house, I have provided a work bench 20 for the trimmers, and to the rear of that a bench 21 for the packers. The trimmers stand between the vehicles 1 and their benches 20, and remove the heads of lettuce from the said vehicles as the said vehicles move slowly by. It is desirable that one, two, three or more vehicles be coupled together and move continuously and progressively past the benches of the workers, thus when a field vehicle is brought in from the fields to the packing shed, it is coupled to the vehicle next in line ahead of it, permitting the vehicle at the head of the line which has been emptied by that time, to be returned to the field for loading. The connected vehicles may be moved along the trackway 17 either by an endless conveyer, or by a cable or by a tractor, or in any other manner which will effect the desired slow speed movement thereof past the workers. As soon as a loaded vehicle is brought into the packing shed, two of the hoists are brought to a position over one side of the vehicle, and coupled thereto to arrange the bed or tray in the bottom of the vehicle into a slightly elevated position. As the vehicle moves slowly forward along the packing line, the tray or bed is gradually raised to increase the tilt thereof and thereby cause the gradual feeding of the contents of the vehicle toward the side of the vehicle along which the workers stand. The hoists move along with the vehicles and by the time a vehicle reaches the end of the line, the tray or bed thereof has been tilted to the maximum extent, and all of the contents thereof discharged from the said vehicle. When this occurs, the hoist is manipulated to lower the bed down into the chassis of the vehicle, and the hoist is disconnected therefrom and moved around on a return portion of the track 15, to a point where the said hoist may be engaged with the last field vehicle entering the said packing shed, and the tilting operation of the bed of said vehicle carried on in the manner heretofore described.

With my method of and apparatus for handling lettuce, I dispense with the necessity of field crates, and require but one handling of a head of lettuce between the time that it is cut in the field and packed in the crate in which it is carried to market. With my system, the field workers cut from five rows of lettuce simultaneously, and uninterruptedly. With my system, the packing shed workers may start to work in the morning a predetermined period of time after the field workers commence their labors and by staggering the periods of time at which the shed workers commence their work, it is possible to eliminate all loss of time of the shed workers and to make their working efforts coincide precisely with the delivery of the cut lettuce from the fields. For example, when the first loaded vehicle enters the packing shed, then the first crew of shed workers commence their labors; when the second loaded vehicle enters the shed then the second crew starts to work, and so on until all of the crews are working when the packing line is filled with loaded and partially emptied vehicles. With my system, the shed workers are in the advantageous position of having the material which they are to work upon brought directly to them, thus eliminating the necessity of said workers moving from their working positions elsewhere about the shed, or otherwise breaking up the continuity of their working operations. With my system, I have found that less damage is caused the lettuce head by handling it once in accordance with the steps of my process, than in accordance with the old processes where the lettuce head is handled two or more times. The head of lettuce is very susceptible to bruising and the very fact that it is first packed into a field crate by the old process, causes it damage, which, however minor, does not result with the steps of my process. The field workers merely throw or place the heads of lettuce on the vehicle in loose or bulk form, and as a result no damage results to the head of lettuce.

Taking the same volume of lettuce when delivered to the packing shed in field crates, and delivered to the said packing sheds by my vehicles, I have found that my method, because of the ease and non-damaging manner in which the lettuce is handled, permits an increase of one or more finally packed crates of lettuce over the final pack wherein the lettuce has been delivered to the packing shed in field crates.

With my system and using my vehicles, a smaller field crew can deliver to the packing shed the same amount of lettuce that would be delivered by a larger crew of field workers using field crates. The capital cost of my apparatus is no greater than the equipment necessary for handling lettuce in accordance with any of the present systems, yet with my method, the labor costs are reduced and the production figures are increased solely due to the elimination of the waste field steps which are present in the common systems of handling lettuce, and which have been eliminated in my process and through the use of my apparatus.

In the modified form of the invention shown in Figs. 6 and 7, I have provided a vehicle chassis 2' which has a pair of aligned sprockets 30—30 adjacent each of its opposite ends, said sprockets being fixedly mounted on the opposite shafts 31—31 which are journaled on the under side of the chassis. An endless chain 32 passes around each pair of sprockets 30—30 and the upper run of said chain is concealed in a groove in the face of the chassis. A bed member 33 is provided along one side of the chassis and said member is secured to the upper run of the respective chains 32—32 whereby said bed member may be moved from one side transversely across the chassis to discharge the contents out from the other side of the chassis. The chain sprockets may be turned manually by the handle 34 or by mechanical means, not shown.

Having thus described this invention, what I claim and desire to secure by Letters Patent is:

1. A mobile vehicle to be used in the harvesting of vegetables comprising a body having road wheels thereon, the gage of which is equal to the spaces on opposite sides of a row of planted vegetables, and having fixed members on the upper side of opposite ends thereof; a pair of endless belts arranged transversely of the floor of the body; a member arranged longitudinally of the body along one side thereof and connected at spaced points to said belts, and adapted at times to form a side member for said body, and at other times to push the contents of said body toward the open side thereof to effect progressive unloading of the vehicle from the open side thereof without interfering with its forward or rearward movement; and means on the vehicle to actuate said belts to move the pusher member across the floor of said body.

2. A mobile vehicle to be used in the harvesting of vegetables comprising a body having road wheels thereon; fixed, upright end members on the opposite upper ends of said body; a member arranged longitudinally of the body along one of the upper sides thereof forming at times a side member for said body and at other times to move the contents of the vehicle in a transverse direction toward the other side of said body to permit progressive unloading of the vehicle from the open side thereof without interfering with the forward movement of the vehicle; and means on the vehicle to move the movable side member transversely of the body.

ELTON W. VESSEY.